(12) United States Patent
Miller et al.

(10) Patent No.: US 6,938,750 B2
(45) Date of Patent: Sep. 6, 2005

(54) SORTER CONVEYOR

(75) Inventors: Henrik Miller, Hinnerup (DK); John Nymann Pedersen, Lystrup (DK); Dennis Sorensen, Hammel (DK); Hans Henrik Jochumsen, Allerod (DK); Thomas Schmidt Madsen, Arhus (DK)

(73) Assignee: Crisplant A/S, Arhus N. (DK)

( * ) Notice: Subject to any disclaimer, the term of this patent is extended or adjusted under 35 U.S.C. 154(b) by 0 days.

(21) Appl. No.: 10/466,807

(22) PCT Filed: Jan. 22, 2002

(86) PCT No.: PCT/DK02/00045

§ 371 (c)(1),
(2), (4) Date: Dec. 17, 2003

(87) PCT Pub. No.: WO02/057161

PCT Pub. Date: Jul. 25, 2002

(65) Prior Publication Data

US 2004/0134752 A1 Jul. 15, 2004

(30) Foreign Application Priority Data

Jan. 22, 2001 (DK) .......................... 2001 00107

(51) Int. Cl.⁷ .............................. B65G 17/32
(52) U.S. Cl. .................. 198/370.06; 198/370.04
(58) Field of Search .............. 198/370.01, 370.04, 198/370.06, 370.1, 370.13, 371.2

(56) References Cited

U.S. PATENT DOCUMENTS

| | | | | |
|---|---|---|---|---|
| 4,792,036 A | * | 12/1988 | Heidelberg | 198/370.04 |
| 5,054,601 A | * | 10/1991 | Sjogren et al. | 198/370.04 |
| 5,690,209 A | * | 11/1997 | Kofoed | 198/370.06 |
| 5,701,992 A | * | 12/1997 | Enomoto | 198/370.06 |
| 5,803,230 A | * | 9/1998 | Canziani et al. | 198/370.06 |

FOREIGN PATENT DOCUMENTS

| | | |
|---|---|---|
| EP | 0425021 B1 | 10/1993 |
| EP | 0752381 B1 | 2/2000 |
| FR | 1313243 | 12/1962 |
| FR | 2096810 | 3/1972 |
| JP | 56083251 | 7/1981 |
| JP | 58212354 | 12/1983 |
| JP | 61157249 | 7/1986 |
| WO | WO 00/23203 | 4/2000 |
| WO | WO 00/71446 A1 | 11/2000 |

OTHER PUBLICATIONS

English Translation of International Preliminary Examination Report dated Jul. 23, 2003.

* cited by examiner

Primary Examiner—James R. Bidwell
(74) Attorney, Agent, or Firm—Harness, Dickey & Pierce, PLC

(57) ABSTRACT

A sorter conveyor having cross-belts for supporting and discharging article is disclosed, wherein the cross-belts are driven by interaction between a rotor moving with the cross-belts and stationary electric stator parts, wherein the rotor is arranged separate from the cross-belt and is connected to a drive roller with a transmission. Further is disclosed such sorter conveyors having tilt-trays driven by interaction between rotors moving with the tilt-trays and stationary electric stator parts, as well as such sorter conveyors which are driven along the stationary track by means of stationary linear motor stator parts interacting with the reaction means. Lastly, rotors and the manufacture of such rotors are disclosed.

42 Claims, 19 Drawing Sheets

SORTER CONVEYOR

This application is the national phase under 35 U.S.C. § 371 of PCT International Application No. PCT/DK02/00045 which has an International filing date of Jan. 22, 2002, which designated the United States of America and which claims priority on Danish Patent Application number DK PA 2001 00107 filed Jan. 22, 2001, the entire contents of which are hereby incorporated herein by reference.

TECHNICAL FIELD

The present invention relates to sorter conveyors having cross-belts for supporting and discharging articles, wherein the cross-belts are driven by interaction between reaction means moving with the cross-belts and stationary electric stator parts, also known as Arch Induction Motors.

The invention further relates to sorter conveyors having tilt-trays for supporting and discharging articles, wherein the tilting of the trays are driven by interaction between reaction means moving with the tilt-trays and stationary electric stator parts.

Furthermore, the invention relates to such sorter conveyors which are driven along the stationary track by means of stationary linear motor stator parts interacting with the reaction means.

Lastly, the invention relates to rotors and the manufacture of rotors suitable of being employed as said reaction means.

BACKGROUND

Sorter conveyors comprising a plurality of cross-belt units for supporting articles and transport these along a stationary track part forming a closed loop from one or more induction stations to a plurality of different discharge stations are well-known in the art.

A problem with respect to such sorter conveyors is that a drive unit must be provided for each cross-belt unit to move said belt for discharge of articles and, in case of induction of articles from the side of the sorter conveyor, also during induction of the articles. Commonly, each cross-belt unit is provided with a separate electric motor that is expensive to provide and maintain and which requires a transfer of power to the moving part of the sorter conveyor by means of e.g. inductive energy transfer or an electrical rail and collector shoes. Also, a control system must be provided on the moving part of the sorter conveyor as well as means for transferring control signals to said control system.

A known solution is to equip the sorter with stationary electric stator parts capable of producing a pulsating electrical field where a movement of the cross-belts may be required, and to equip each cross-belt unit with a drive part that is susceptible to said electrical field such that the cross-belts may be driven by means of the stationary electric stator part, thus making the provision of complete electric motors on the moving part of the sorter conveyor redundant.

It is known from FR 2 096 810 by Jeumont-Schneider to provide each cross-belt with a plurality of metallic strips parallel to the direction of movement of the sorter, thereby making the belt itself susceptible to the field from the stationary electric stator parts.

A solution allowing the use of standard cross-belts is disclosed in EP 0 425 021 by Van den Goor, in which a reaction roller being susceptible to the field for the stationary electric stator part is provided on each cross-belt unit, wherein the cross-belt is in contact with the reaction roller over part of the circumference of said roller to provide drive force from the reaction roller to the belt by friction. The cross-belt is guided along the part of the circumference of the reaction roller being opposite to the part facing the stationary electric stator part by means of two rollers biasing the cross-belt towards the reaction roller.

It is a problem with the latter discussed sorter conveyor that the cross-belt requires contact with as large a part of the circumference of the reaction roller as possible in order to provide the necessary friction force between the cross-belt and the reaction roller, and the stationary electric stator parts requires magnetic contact with as large a part of the circumference of the reaction roller as well in order to provide a satisfactory degree of efficiency of the system for driving the cross-belt. However, the cross-belt and the two biasing rollers limit the circumferential part of the reaction roller available to the stationary electric stator parts. Thus, both the cross-belt and the stationary electric stator parts requires access to as large a part of the circumference of the reaction roller as possible.

It is an object of the present invention to provide a cross-belt sorter conveyor with stationary electric stator parts for driving the cross-belts, in which the above-discussed problem of access to the circumference of the reaction roller for both the cross-belt and the stationary electric stator parts is relieved.

One solution would be to guide the cross-belt around the reaction roller between the reaction roller and the stationary electric stator parts but this results is an increased distance or gap between the reaction roller and the stationary electric stator parts, resulting in an increased magnetic reluctance and a lower efficiency of the drive system.

The solution provided with the present invention is to separate the function of the known reaction roller into a rotor being susceptible to the field of the stationary electric stator parts, a drive roller which over a part of its circumference is in driving contact with the cross-belt, and a transmission between the rotor and the drive roller for transmitting the drive force there between.

This solution provides other advantages as well. The two biasing rollers are made redundant and simpler bearing may be used for the rotor as compared to the reaction roller of the prior art because the bearing is relieved from the forces due to the internal stress of the cross-belt.

The separation of the function of the reaction roller into the rotor and the drive roller also permit a gearing between the two by means of the transmission, such that the circumferential speed of the rotor may be different from, and in particular higher than that of the drive roller. Thereby, a given rotor may yield more power as the power is proportional with the circumferential speed. Furthermore, a feedback system for providing a measure of the movement of the cross-belt to the stationary control system of the sorter conveyor by means of measuring the rotation of the rotor may be given a better resolution due to the gearing. A yet further advantage occur in case the cross-belt is locking means of braking the rotor when the units are passing curved parts of the stationary track by and a gearing is made between the rotor and the drive cylinder, as a locking torque applied to the rotor will be multiplied by the gearing ratio when acting on the cross-belt.

The separation of functions also allows for a more flexible design of the cross-belt units and facilitates that the rotor may be situated at the level of the tracks on which the sorter moves or even lower in order to be in close contact with the stationary electric stator parts.

Other objects and advantages of the present invention will be apparent from the description of the invention.

The present invention relates in a second aspect to a sorter conveyor comprising tilt-tray units for supporting articles and transport these along a stationary track part forming a closed loop from one or more induction stations to a plurality of different discharge stations, in which the tilt of the trays are driven by means of electric motors which has turned out to be advantageous and is disclosed e.g. in WO 00/71446. It is however expensive to provide each tilt-tray unit with a separate electric motor and to maintain or replace motors due to malfunction of the active parts of the motor. The motors require a transfer of power to the moving part of the sorter conveyor by means of e.g. inductive energy transfer or an electrical rail and collector shoes. Also, a control system must be provided on the moving part of the sorter conveyor as well as means for transferring control signals to said control system. This type of sorter conveyors have been improved by the second aspect of the present invention by providing at least one stationary electric stator part along the stationary track part of the sorter conveyor, the stator parts being arranged to selectively produce a travelling magnetic field, and by arranging a rotor susceptible to said travelling magnetic field on each tilt-tray unit such that it may apply a driving force to tilt the tray when co-operating with the at least one stationary electric stator part. Thus, the requirement of one electric motor and the provision of electric power and control signals on the moving part of the sorter conveyor are made redundant.

The present invention relates in a third aspect to a sorter conveyor having arranged along the stationary track part at least one stationary electric stator part that may be activated selectively to produce a travelling magnetic field, and for each article-supporting unit comprises a rotor susceptible to said travelling magnetic field and arranged to apply a driving force to the discharge means when co-operating with the at least one stationary electric stator part, such as according to the two first aspects of the present invention as discussed above. The sorter conveyor requires drive means for driving the moving part along the stationary track part, which drive means may be stationary linear motors interacting with reaction means on the moving part, such as an aluminium plate covering a steel plate for a linear asynchronous motor drive or a set of permanent magnets for a linear synchronous motor drive. In both cases, it has been found that an advantage may be obtained by letting one or more stationary linear motor stator parts interact with the rotors to produce a driving force to drive the sorter along the stationary track part, thus letting the rotors take the place of the separate reaction means and making the sorter lighter and less expensive in construction.

The present invention relates in a fourth aspect to a simple rotor and to a method of manufacturing such rotor. A rotor for interacting with a stationary electric stator in an asynchronous manner may comprise an inner steel tube covered by an outer tube of a suitable material, such as copper or preferably aluminium, the inner surface of the aluminium tube being in contact with the outer surface of the steel tube. Such rotors are commonly manufactured by processing said two surfaces to a mutual interference fit, e.g. by turning the tubes, where after the tubes are assembled to a rotor. The tolerances have to be small, as the length of the aluminium tube does not allow for much pressing force before giving in to buckling. This manufacturing method is labour-intensive and the rotors are therefore relatively expensive. One object of the present invention is to provide less expensive rotors.

Such rotor may according to the present invention comprise one actual tube and the second of the inner or outer tubular members consist of a length of material being deformed into a tubular shape fastened to the first tubular member so as to preserve the tubular shape of the second tubular member as well as the contact between the two tubular members. Thereby, the rotor may be manufactured in a less expensive manner.

BRIEF DESCRIPTION OF THE PRESENT INVENTION

The present invention relates in a primary aspect to a conveyor comprising
  a stationary track part,
  at least one stationary electric stator part that may be activated selectively to produce a travelling magnetic field and is arranged along the stationary track part,
  a sorter movably arranged to be driven along the stationary track part by means of drive means, and
  a plurality of article-supporting units arranged on the sorter, each unit having
    a flexible member defining an article-supporting surface and being arranged movably in a direction substantially perpendicularly to the direction of motion of the sorter, and
    a rotor susceptible to said travelling magnetic field and arranged to apply a driving force to the flexible member when co-operating with the at least one stationary electric stator part,
wherein the conveyor is distinct from the prior art in that each article-supporting unit comprises
  a drive roller which over a part of its circumference is in driving contact with the flexible member, and
  a transmission means for transmitting driving force from the rotor to the drive roller.

The flexible member, i.e. the cross-belt, may in a preferred embodiment be an endless belt as is commonly known from cross-belt sorters. However, flexible sheets or chain-like arrangements of a finite length may also be applied within the present invention.

The rotor is required to be susceptible to the travelling magnetic field, which may be provided by irregularities of the magnetic properties along the circumference of the rotor, such as the reluctance of the rotor, longitudinal grooves forming teeth and creating an irregularity of the magnetic conducting properties or the presence of permanent magnets in the rotor. However, a preferred type of rotor comprises an inner steel tube and an outer aluminium tube together forming a rotor that operates as a part of an induction motor with the stationary electric stator parts.

It is preferred to use a toothed belt and two toothed wheels as transmission means, but other types as chain transmission, gear wheels, a drive shaft with bevel gear wheels etc. may likewise be employed by the skilled person.

The transmission means may advantageously have a gearing ratio in the range of 1.5 to 5, preferably in the range of 2 to 4, between the rotor and the drive roller, so that the rotor has a higher angular speed than the drive roller. A gearing ratio of about 3 has been found to be very suitable. The advantages of the gearing ratio are discussed previously.

In order to prevent the cross-belts with articles thereon to start moving when passing curved parts of the stationary tracks due to the apparent centrifugal force, causing the articles to be discharged unintentionally, the conveyor may comprise locking means for preventing the motion of the flexible members of the article-supporting units. Prior art cross-belt units having a complete electric motor on unit may be locked by means of the motor but this opportunity does not exist with the conveyor according to the present invention. The lack of locking means for the cross-belt puts a limit to the maximum conveyance speed of a given conveyor, whereas the existence of locking means allows for higher conveyance speeds and thereby higher efficiency of the conveyor.

The locking means may be passive means such as wheels mounted stationary on the curved track part to engage the cross-belts and prevent them from moving transversely to the direction of conveyance.

Active locking means are however preferred, in particular locking means that are activated contact-less, such as locking means that are activated by the deviation from alignment of adjacent article-supporting units in curved sections of the stationary track part. The pinching of the consecutive article-supporting units on the inside of the curves and/or the elongation between points on consecutive article-supporting units on the outer side of the curves provides a suitable drive means for activating locking means. Alternatively, the apparent centrifugal force on article-supporting units moving in curved sections of the stationary track part may be used as drive means for driving the activation of the locking means, e.g. by means of a spring affected mass being movable transversely to the conveyance direction and activating the locking means under influence of the apparent centrifugal force.

According to other embodiments, the locking means may be braking constantly and only be released when needed, e.g. being released by means of magnetic forces applied by stationary electromagnets, such as the stationary electric stator part acting on a release means, such as a steel bar, or by means of the attraction forces between the at least one stationary electric stator part and the rotor. These magnetic forces may, depending on the layout of the system, exert a downward or upward force on the rotor as well as a force in or against the direction of conveyance, which force may be employed to release the locking.

According to another embodiment having a constant locking effect, the locking means comprises on each article-supporting unit a stationary part in engagement with a movable part moving simultaneously with the flexible member, characterised in that the resistance against mutual movements between the stationary part and the movable part is substantially lowered during mutual movement between said two parts. In particular, the stationary part may be a support surface supporting the side of the flexible member opposite the article-supporting surface, and the friction characteristics between the flexible member and the support surface are characterised in that the friction is substantially lowered at mutual movement between said two parts.

Another manner of preventing articles from being discharged unintentionally when passing curved track sections is to provide tilting means for tilting the article-supporting surfaces inwardly when passing curved sections of the stationary track part, and drive means for driving said tilting means, wherein said drive means are driven by the deviation from alignment of adjacent article-supporting units in curved sections of the stationary track part.

As no active control means are present on the moving part of the conveyor in preferred embodiments, the conveyor should comprise feedback means for providing a output to a control unit of the conveyor indicative of the movement of the flexible member, so that the movement may be measured and thereby the function of the flexible member.

One method of providing a feedback is where the feedback means comprise a camera for detecting at least two consecutive images of at least one of the flexible member, the rotor or the transmission, and computing means for providing an output from said images.

It is preferred that the feedback means detect the extend of rotation of the rotor of each of the article-supporting units and provide an output accordingly. This may be realised if the rotor comprises at least one irregularity of the susceptibility to the travelling magnetic filed, causing the power supplied to the stationary electric stator to vary when the at least one irregularity passes the stationary electric stator during rotation of the rotor, said variation being detected by the feed-back means. Another manner of realising the feedback is when the outer surface of the rotor comprises at least one irregularity of its optical characteristics, such as a colour variation or a reflectivity variation, and the feedback means comprises a detector for detecting the variation of reflection of a light source caused by the at least one irregularity during rotation of the rotor and providing an output accordingly. The irregularity may e.g. be in the form of lines preferably being parallel to the axis of rotation of the rotor.

Yet another embodiment includes that each article-supporting unit comprises signal means for producing a signal indicative of the movement of the flexible member and the feed-back means comprises a detector for detecting said signals and producing an output accordingly. The signal may be an audio signal, e.g. from a ratchet mounted on the rotor, or a visual signal, e.g. produced by means of a piezo electric crystal that is deformed by an eccentric wheel mounted on the rotor shaft and a pair of spark electrodes connected thereto, producing detectable sparks during rotation of the rotor.

A yet further embodiment includes signal means that comprises at least one passive circuit moving simultaneously with the flexible member, the passive circuits having an induction part for inducting an electric current when exposed to a magnetic field and a transmitter part for transmitting a electromagnetic signal and driven by the inducted current, the feed-back means comprising a detector for detecting said signal and providing an output according to the variations of the signal due to said movement of the one or more passive circuits. This passive circuit, known as radio frequency or RF-tags, may also be used for identification of the individual article-supporting unit.

It is of importance for the efficiency of the interaction between the rotor and the stationary electric stator parts that the air gap between the two is made as small as possible. An adjustment of the position of the stator parts is only partly sufficient as a certain play must be allowed for variations between the article-supporting units due to inaccuracy of production and changes caused by wear. It is therefore, in order to minimise the air gap for each article-supporting unit, preferred that the conveyor comprises horizontal alignment means for situating the article-supporting units precisely with respect to the at least one stationary electric stator part in the direction transversely to the conveyance direction of the conveyor.

One means for providing horizontal alignment comprises a horizontal wheel on the article-supporting unit, which wheel engages a two-sided track of the track part allowing a very small play between the wheel and the two-sided track, thereby ensuring the correct horizontal position of the rotor with respect to the stationary electric stator part.

In particular, the horizontal alignment means may comprise biasing means for providing a biasing force to the article-supporting units toward one side in the transversal direction and reaction means for producing a counter reaction force against said biasing force. The biasing means may be springs or the like, or the biasing means may in a particular embodiment comprise at least one permanent magnet arranged on each of the article-supporting units and a magnetic susceptible stationary part arranged near the at least one stationary electric stator part displaced in the transversal direction with respect to said at least one permanent magnet such that the mutual magnetic force between the at least one permanent magnet and said stationary part constitutes said biasing force.

Alternatively or additionally, the at least one stationary electric stator part may be suspended movably and comprises biasing means for biasing the stator part towards the rotors of the article-supporting units and one or more distance means for providing a suitable distance between the stator part and the rotors.

The rotors may also, as discussed previously, be used for driving the sorter, so that said drive means for driving the sorter along the stationary track part comprises one or more stationary linear motor stator parts interacting with said rotors to produce a driving force to drive the sorter along the stationary track part.

According to the second aspect of the present invention, it further relates to a conveyor comprising a stationary track part, at least one stationary electric stator part that may be activated selectively to produce a travelling magnetic field and is arranged along the stationary track part, a sorter movably arranged to be driven along the stationary track part by means of drive means, and a plurality of article-supporting units arranged on the sorter, each unit having a tray defining an article-supporting surface and being arranged to be tilted in a direction substantially perpendicularly to the direction of motion of the sorter, and a rotor susceptible to said travelling magnetic field and arranged to apply a driving force to tilt the tray when cooperating with the at least one stationary electric stator part.

The above-discussed feedback means, alignment means and drive means comprising stationary linear motor stator parts interacting with said rotors may suitably be applied to the conveyor according to this second aspect.

The present invention relates in a third aspect to a conveyor comprising a stationary track part, at least one stationary electric stator part that may be activated selectively to produce a travelling magnetic field and is arranged along the stationary track part, a sorter movably arranged to be driven along the stationary track part by means of drive means, and a plurality of article-supporting units arranged on the sorter, each unit having article-supporting means defining an article-supporting surface and having discharge means to discharge articles therefrom in a direction substantially perpendicularly to the direction of motion of the sorter, and a rotor susceptible to said travelling magnetic field and arranged to apply a driving force to the discharge means when co-operating with the at least one stationary electric stator part, wherein said drive means comprises one or more stationary linear motor stator parts interacting with said rotors to produce a driving force to drive the sorter along the stationary track part.

The present invention relates in a fourth aspect to a method for manufacturing a tubular rotor for an asynchronous motor comprising an inner tubular magnetic conducting member, such as a steel tube, and an outer tubular member being electric conducting and non-magnetic conducting, such as aluminium or copper, the method comprising the steps of providing a first of said tubular members, providing at least one length of material for the second of said tubular member, deforming said at least one length of material into a tubular shape to form the second tubular member and applying the second tubular member in contact with said first tubular member, and fasten the second tubular member to the first tubular member so as to preserve the tubular shape of the second tubular member as well as the contact between the two tubular members.

It is preferred that the at least one length of material is resilient and is deformed into a shape so that resilient forces in the second tubular member and counteracting reaction forces from the first tubular member fasten the second tubular member to the first tubular member. According to one embodiment thereof, the first tubular member is the inner member and the second tubular member is formed from a sheet material that is rolled to a curvature diameter less than the outer diameter of the first tubular member prior to being applied to the outer perimeter of the first tubular member. According to a second embodiment thereof, the first tubular member is the outer member and the second tubular member is formed from a wire, preferably of a rectangular, such as quadratic cross-section, that is coiled to a helical shape of a diameter exceeding an inner diameter of the first tubular member, the second tubular member being stretched prior to being inserted into the first tubular member where after the stretching is released.

According to yet another embodiment, the first tubular member is the outer member and the second tubular member is formed from one or more sheets of material which each is rolled to a curvature diameter exceeding an inner diameter of the first tubular member and a perimeter length less than the inner perimeter length of the aluminium tube, each sheet being compressed to a diameter less than the inner diameter of the first tubular member prior to being inserted into the first tubular member, where after the compression is released.

According to an alternative method, the first tubular member is the inner member and the second tubular member is formed from a sheet material that is wound in a plurality of layers on the first tubular member. The sheet material may be fastened e.g. by means of glue, by welding or by deformation of the sheet when wounded on the first tubular member.

The present invention relates according to the fourth aspect also to a tubular rotor for an asynchronous motor comprising an inner tubular magnetic conducting member and an outer tubular member being electric conducting and non-magnetic conducting, wherein a first of said tubular members is a tube and the second of said tubular members consist of a length of material being deformed into a tubular shape fastened to the first tubular member so as to preserve the tubular shape of the second tubular member as well as the contact between the two tubular members. The rotor may be manufactured according to one of the above-discussed methods.

BRIEF DESCRIPTION OF THE DRAWINGS

Embodiments of the invention is for illustrative purposes shown in the attached drawings of which

DESCRIPTION OF EMBODIMENTS OF THE INVENTION

Figure 1:
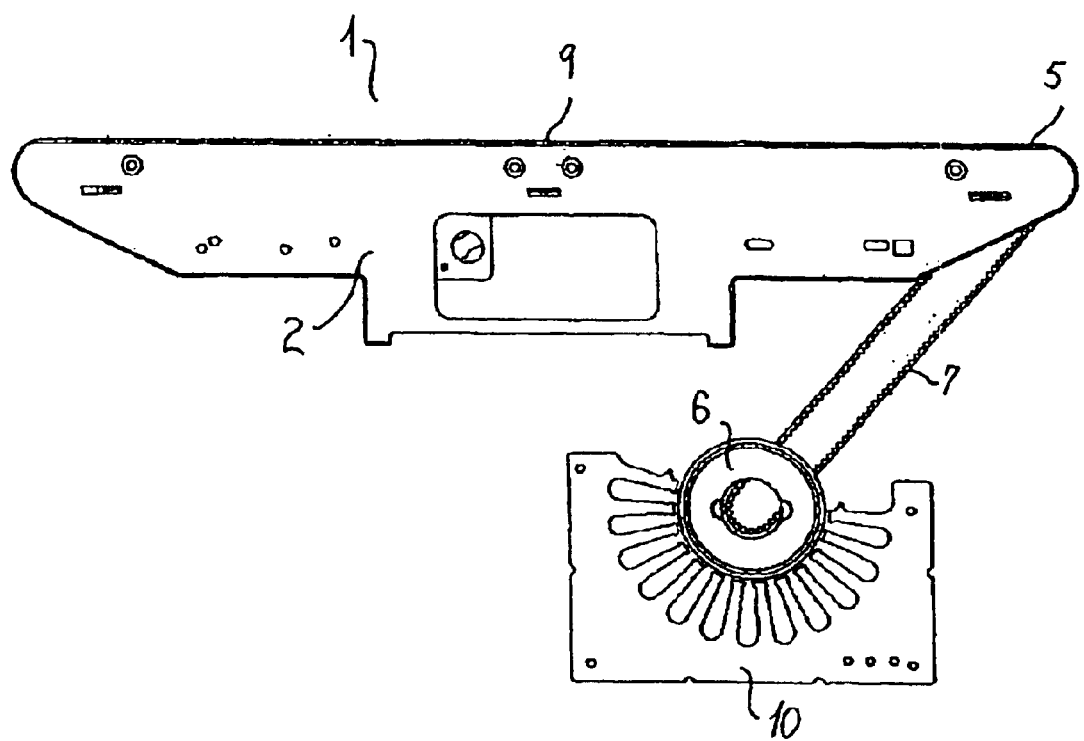
FIG. 1 is an end view of a cross-belt unit according to one embodiment of the present invention.
Figure 2:
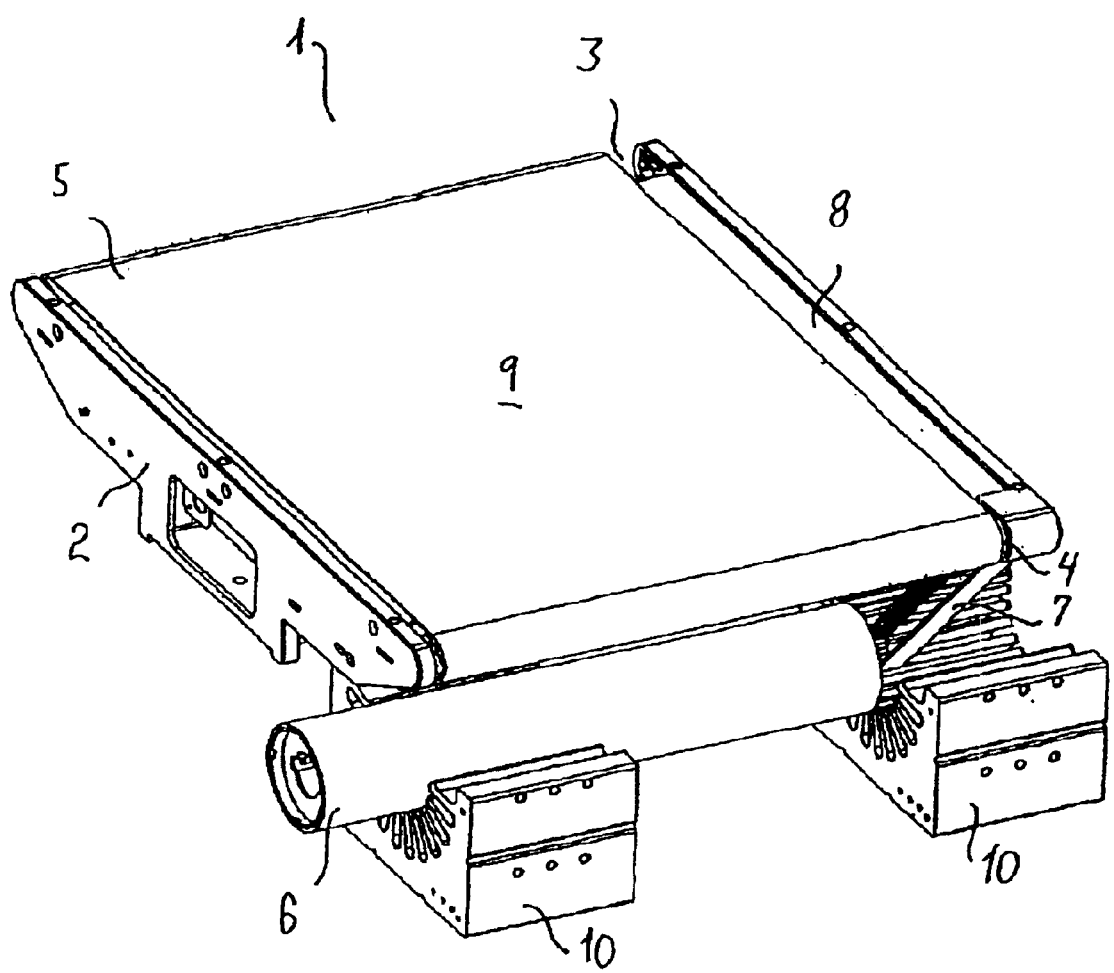
FIG. 2 is a first perspective view of the cross-belt unit of FIG. 1.
Figure 3:
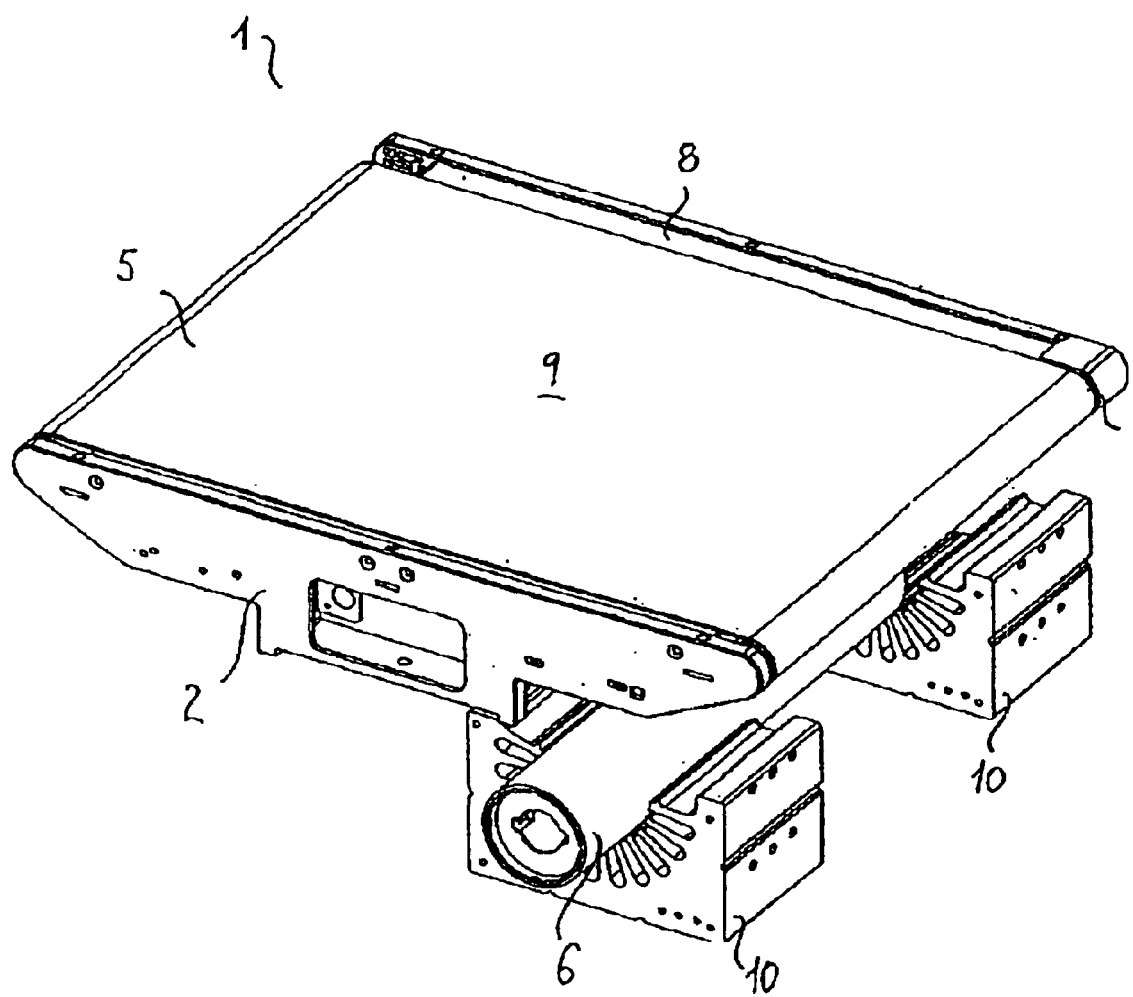
FIG. 3 is a second perspective view of the cross-belt unit of FIG. 1.

The cross-belt unit 1 shown in FIGS. 1–3 comprises a frame part 2 supporting two rollers 3, 4 around which the endless cross-belt 5 is running. One of the rollers 4 is the drive roller 4 connected to a rotor 6 by means of a toothed belt 7. The frame part 2 further carries a support plate 8 supporting the cross-belt 5 on the side opposite to the side forming the article-supporting surface 9 of the cross-belt unit 1. The rotor 6 is situated above two stationary electric stator parts 10.

Figure 4:
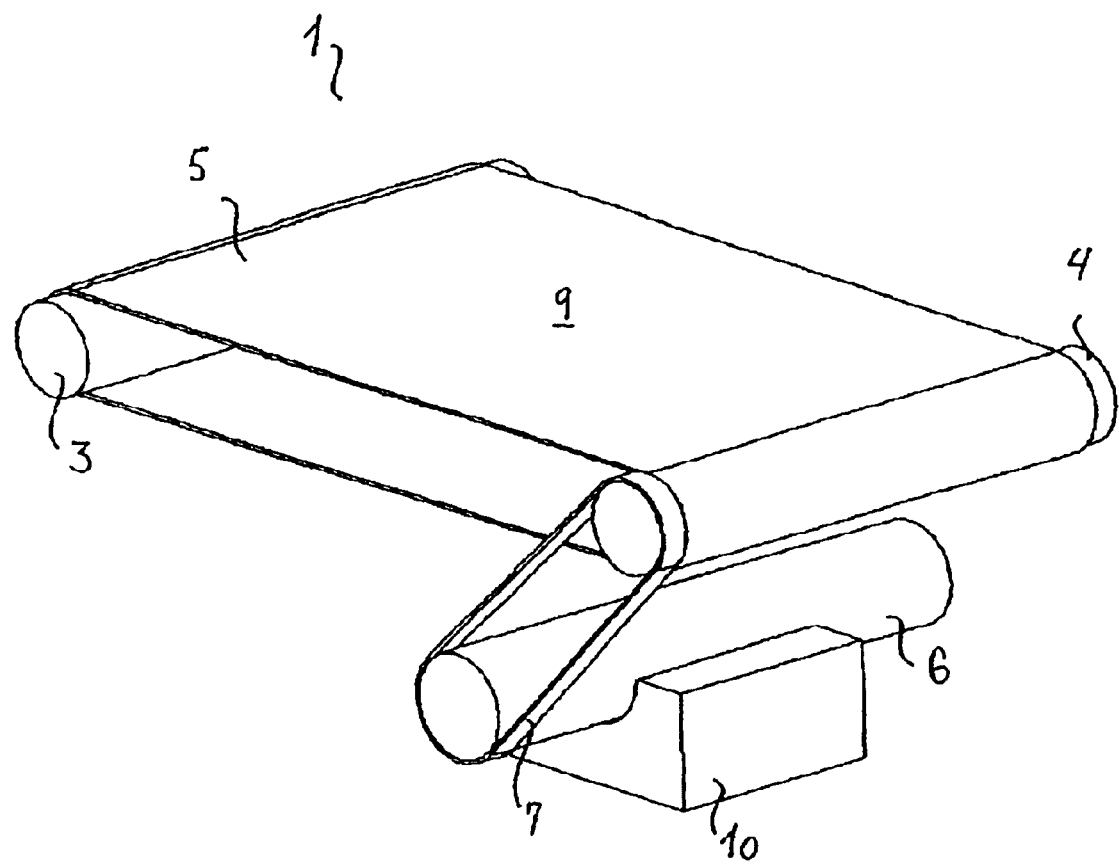
FIG. 4 is a schematic perspective view of the embodiment of a cross-belt unit of FIGS. 1–4.
Figure 5:
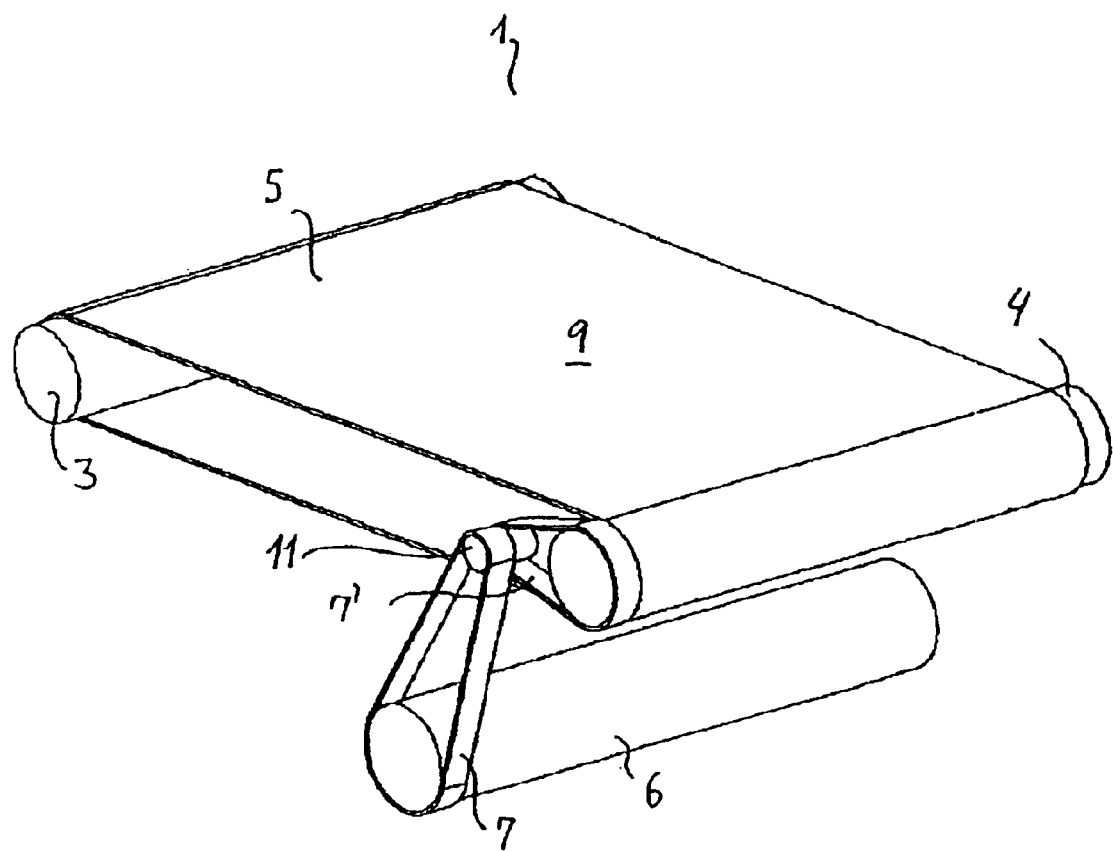
FIG. 5 is a schematic perspective view of a second embodiment of a cross-belt unit.
Figure 6:
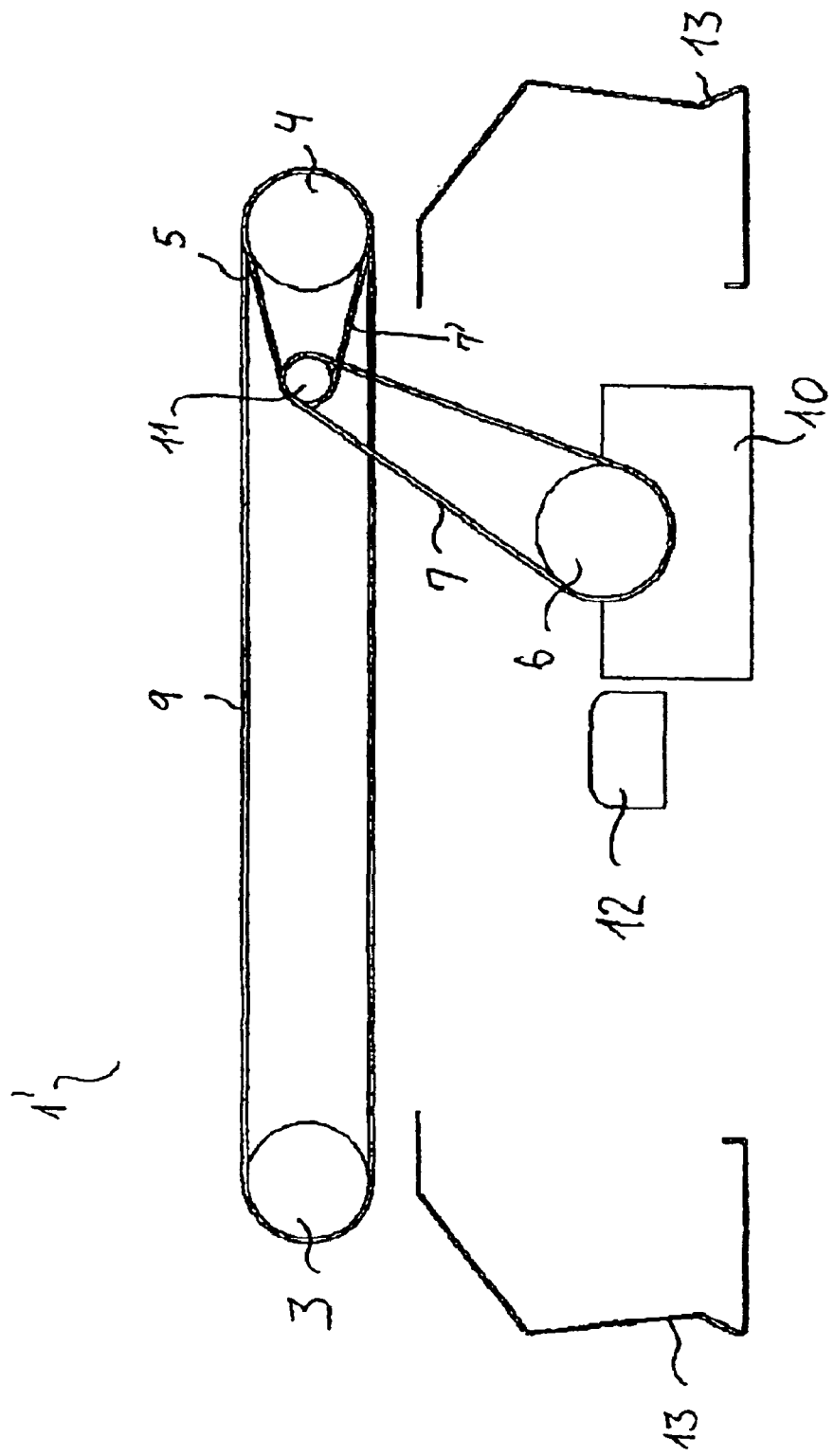
FIG. 6 is a cross-section of the cross-belt unit of FIG. 5.

The schematic view in FIG. 4 of the first embodiment of the cross-belt unit 1 may be compared to a second embodiment of a cross-belt unit 1' shown in FIGS. 5–8. In the second embodiment, the transmission means comprises an intermediate roller 11 connected at a first end to the rotor 6 by means of a first belt and at a second end thereof to the drive roller 4 by means of a second belt 7'. This configuration provides a higher freedom of design and of changing and makes variations of a given design as the path and length of the first belt 7 may be varied easily. On FIGS. 6, 7 and 8, the stationary linear drive motors 12 and the stationary track part 13 are indicated.

Figure 7:
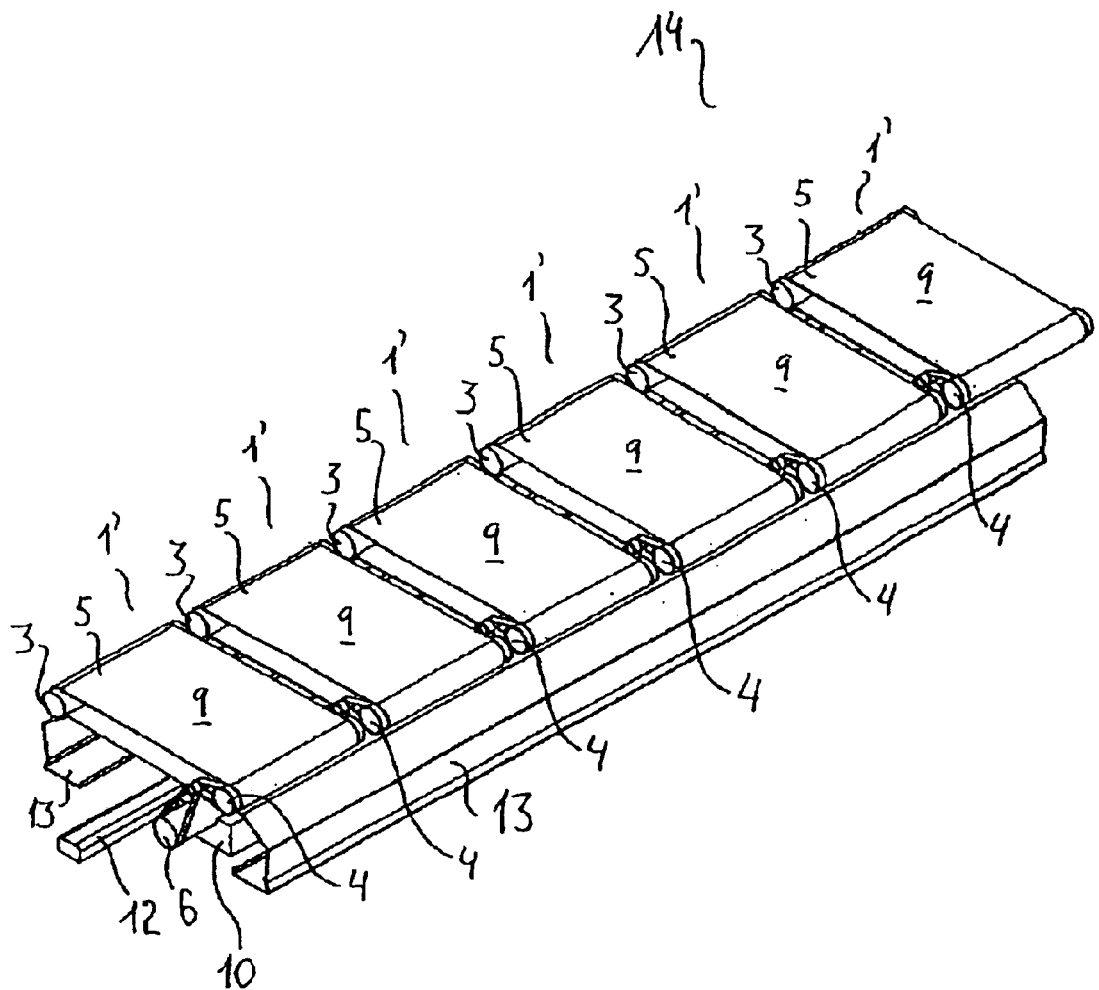
FIG. 7 is a perspective view of a section of a sorter conveyor having cross-belt units according to FIGS. 5 and 6.
Figure 8:
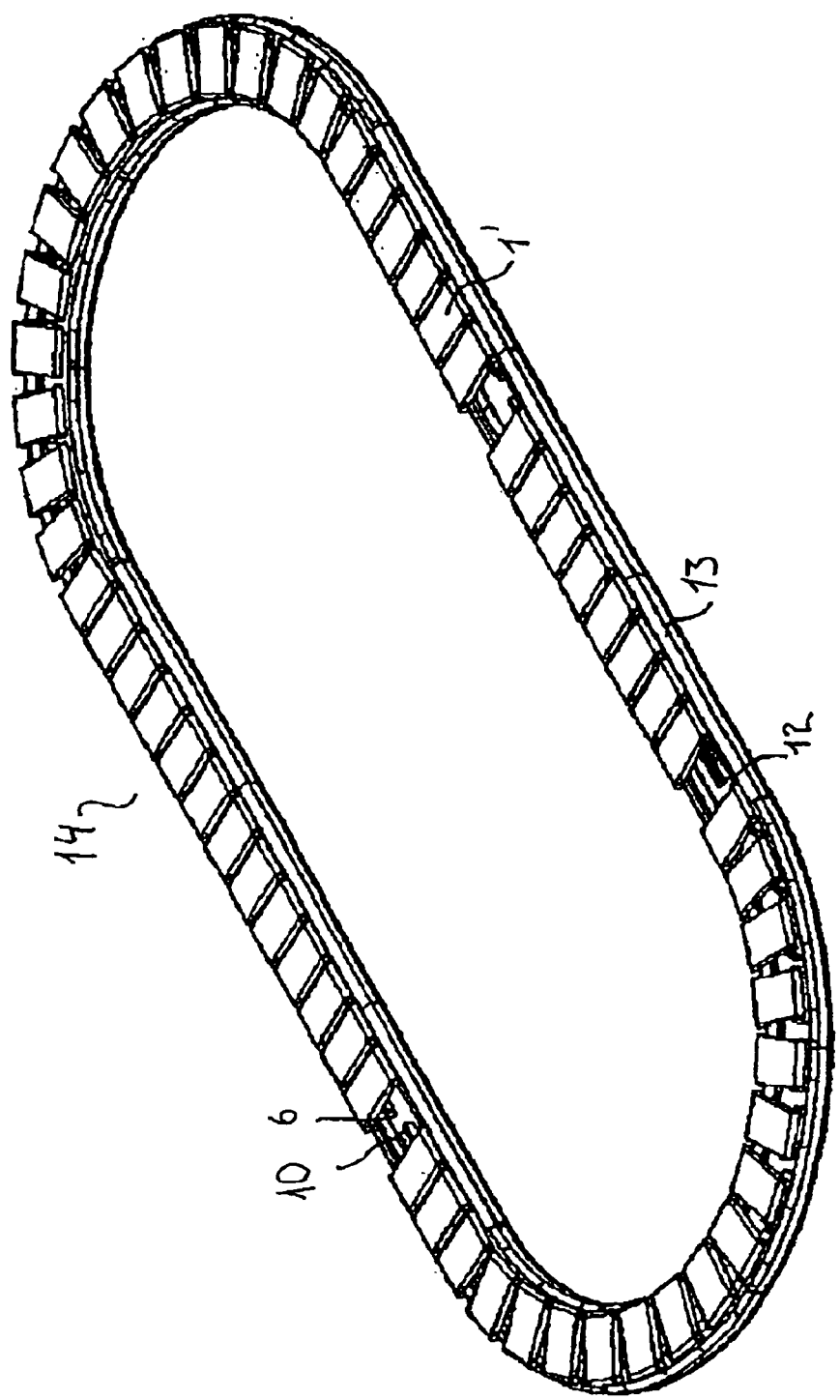
FIG. 8 is a perspective view of a sorter conveyor having cross-belt units according to FIGS. 5 and 6, FIGS. 9a)–d) show an embodiment of a feed-back system.

The cross-belt units 1, 1' are arranged in a consecutive manner forming an articulated conveyor 14 which preferably forms a closed loop as shown in FIG. 8. FIGS. 7 and 8 are not particularly for the second embodiment, the cross-belt unit 1 of the first embodiment may be arranged correspondingly.

Figure 9:
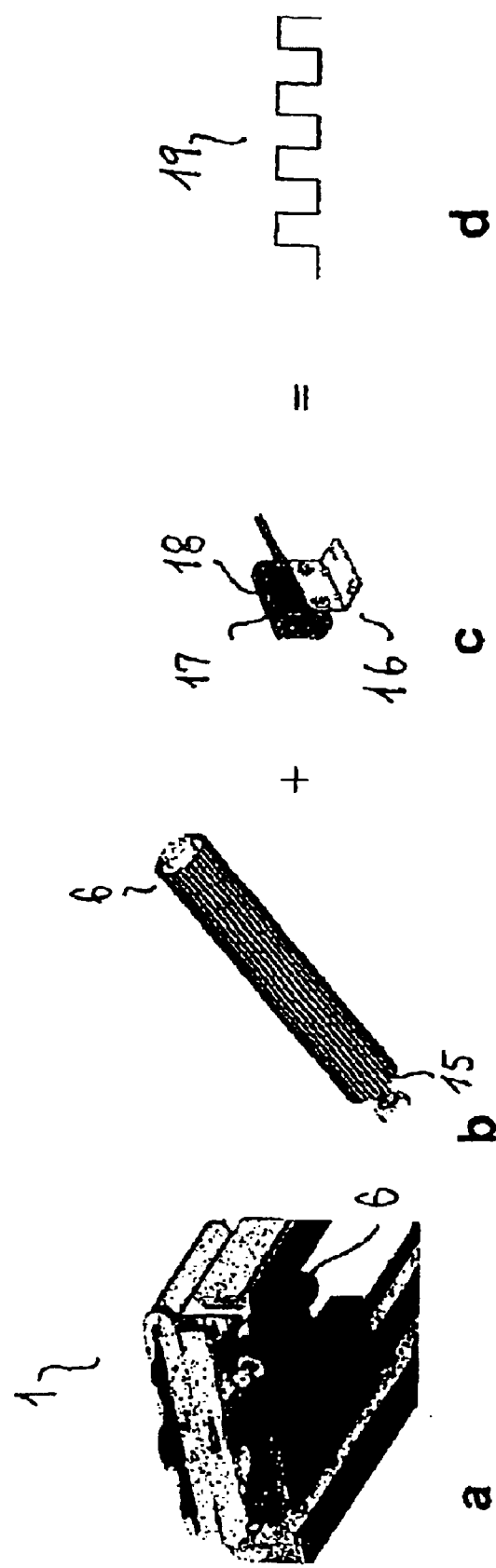

The feed-back system shown in FIGS. 9a)–d) comprises a rotor 6 mounted in a cross-belt unit 1 as shown in FIG. 9a), wherein the rotor 6 has a plurality of longitudinal, reflective stripes 15 as shown in FIG. 9b). The movement of the rotor 6 is measured by a stationary arranged detector 16 shown in FIG. 9c) having a light source 17 and a light reflection detector 18 producing an output 19 as shown in FIG. 9d).

Figure 10:
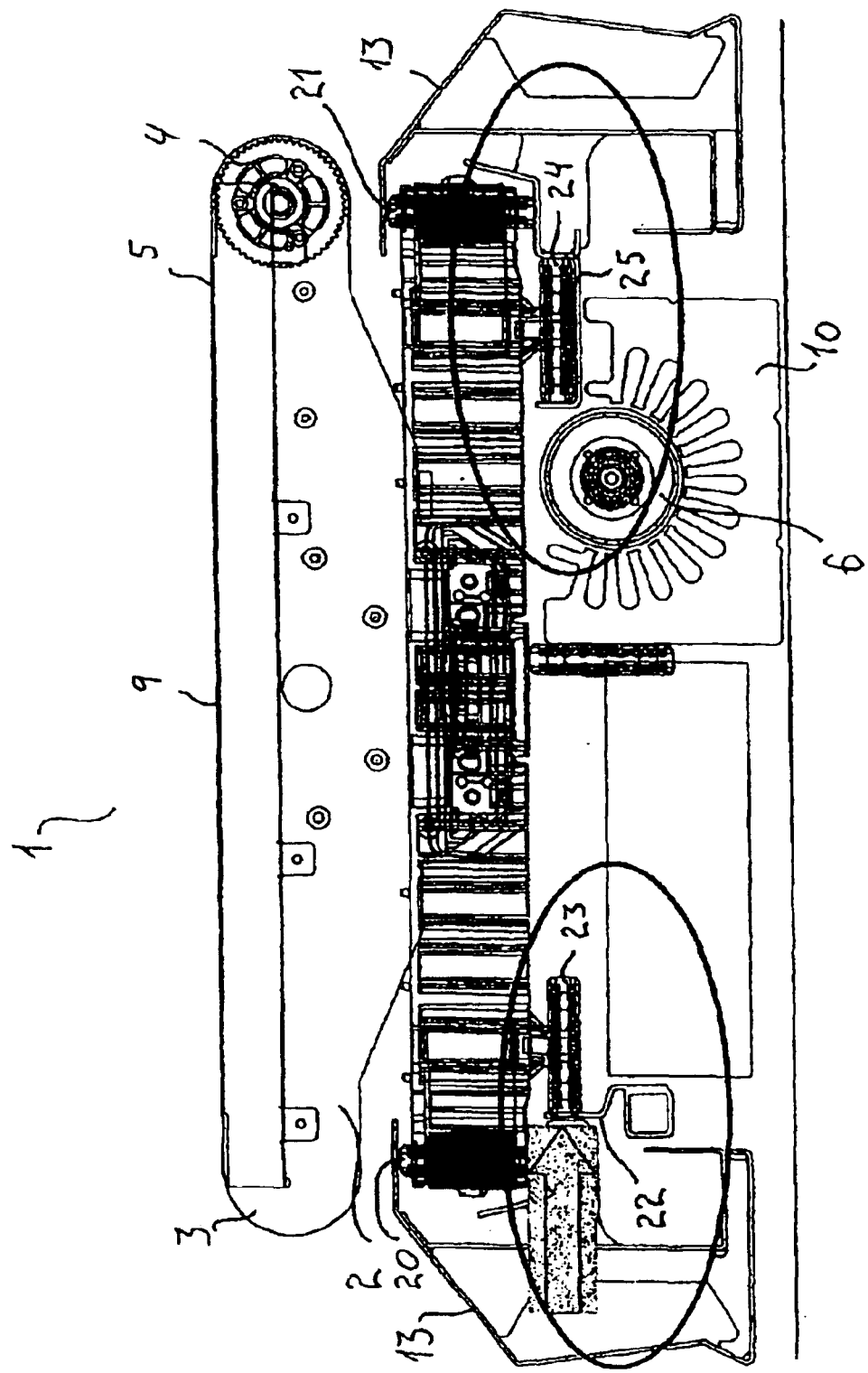
FIG. 10 is an embodiment of horizontal alignment of the article-supporting unit.

Two embodiments of means for providing horizontal alignment of the article-supporting unit are shown in FIG. 10. The cross-belt unit 1 runs on the stationary track part 13 by means of one wheel 20, 21 at each side of the track 13. The horizontal alignment is achieved by a spring 22 extending along the track 13 near the stationary electric stator part 10 and engaging a horizontal wheel 23 of the cross-belt unit 1, biasing the unit 1 towards the opposite side at which a second horizontal wheel 24 of the unit 1 thereby ensuring the correct horizontal position of the rotor 6 with respect to the stationary electric stator part 10. A second embodiments is also shown in FIG. 10 for providing horizontal alignment, in which the horizontal wheel 24 is engaging a two-sided track 25 of the track part, thereby ensuring the correct horizontal position of the rotor 6 with respect to the stationary electric stator part 10.

Figure 11:
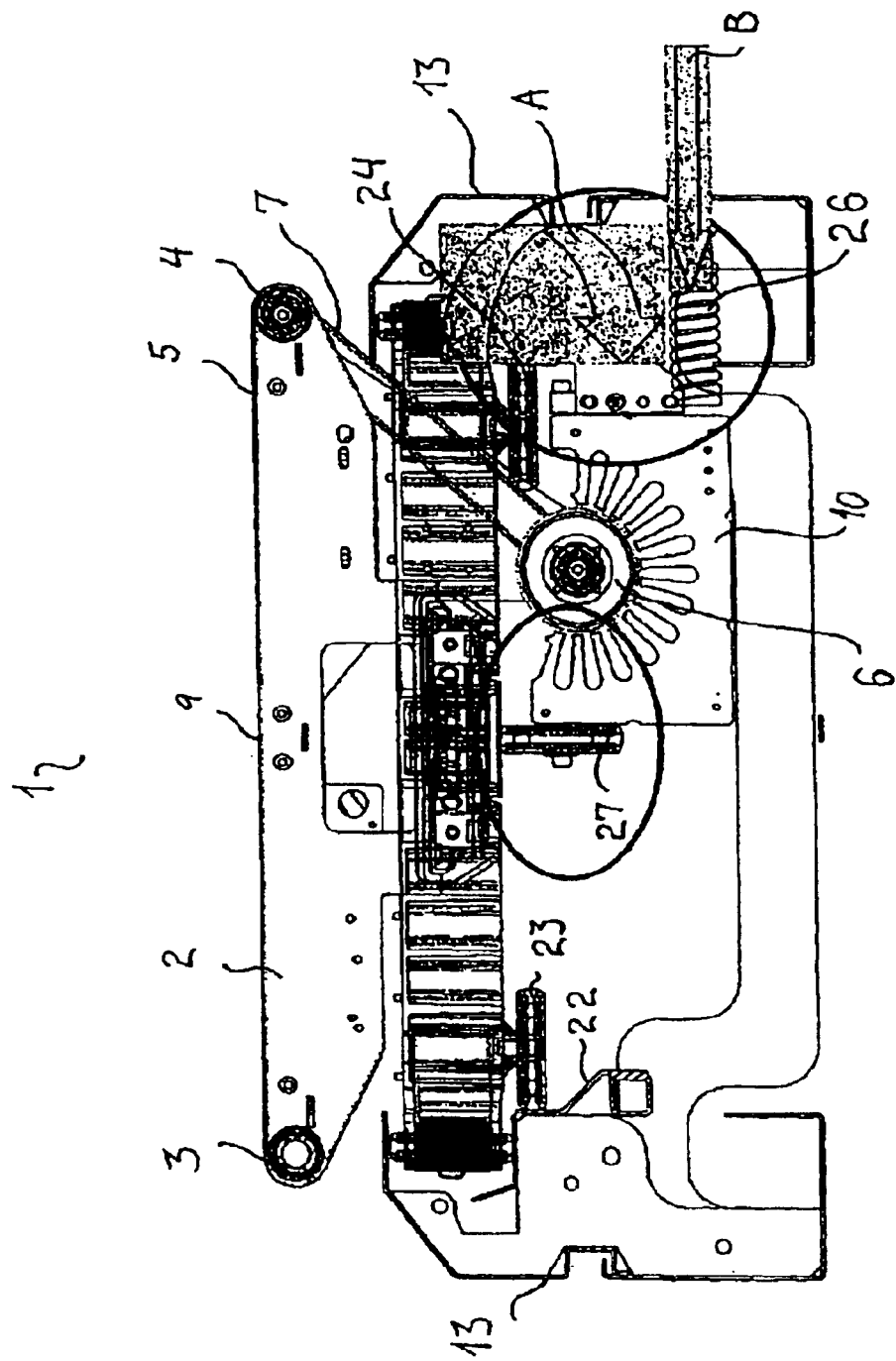
FIG. 11 is an embodiment of vertical alignment of the article-supporting unit, FIGS. 12a) and b) show an embodiment of the rotor with a helical rolled steel tube, FIGS. 13a) and b) show an embodiment of the rotor with rolled shells forming the steel tube, FIGS. 14a) and b) show an embodiment of the rotor with an aluminium sheet forming the outer tube, and FIGS. 15a) and b) show an embodiment of the rotor with a helical wound quadratic wire forming the steel tube.

FIG. 11 is an embodiment of vertical alignment of the article-supporting unit, wherein the stationary electric stator part 10 is hinged on the track part 13 such that is may turn as indicated by the arrow A. A biasing force, indicated with arrow B is provided by means of a spring 26 so that the stator part 10 is moved against the rotor 6 so as to close the air gap. A wheel 27 is arranged on the stator part 10 to engage the frame part 2 of the cross-belt unit 1 to prevent collision between the rotor 6 and the stator part 10.

Figure 12:
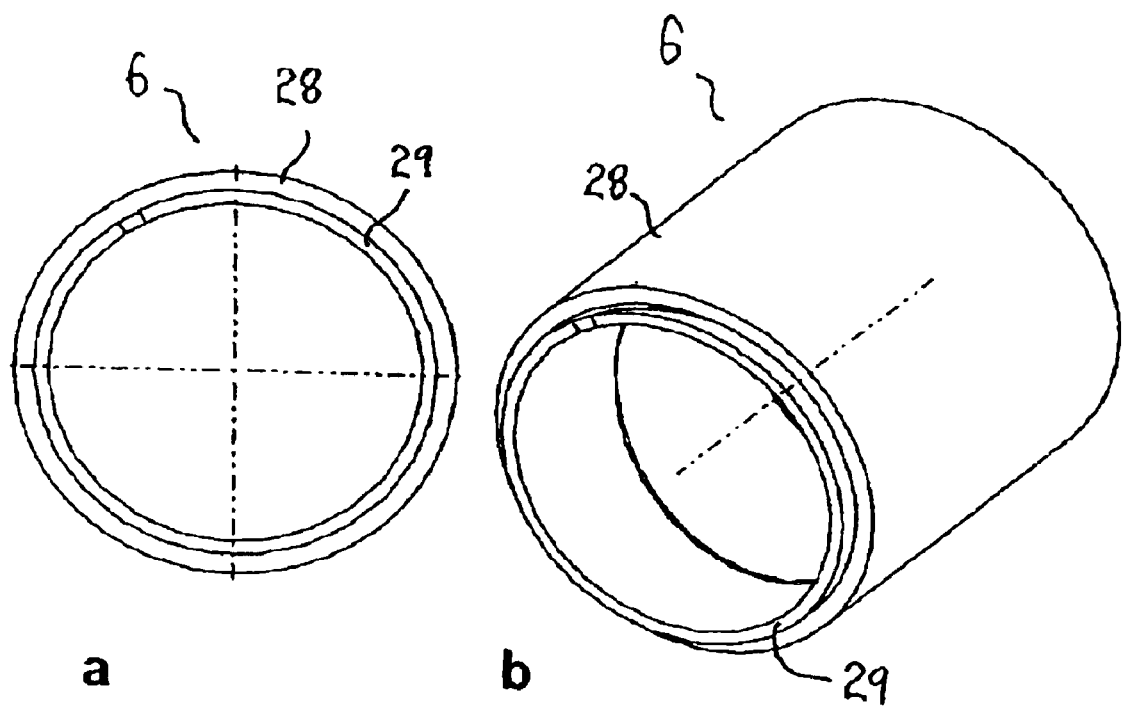

The rotor 6 shown in FIGS. 12a) and b) has an actual aluminium tube 28 equipped with a helical rolled steel inner tube 29, which is stretched prior to insertion into the aluminium tube 28, where after it is released and assumes the shape that keeps it resiliently in place inside the aluminium tube 29.

Figure 13:
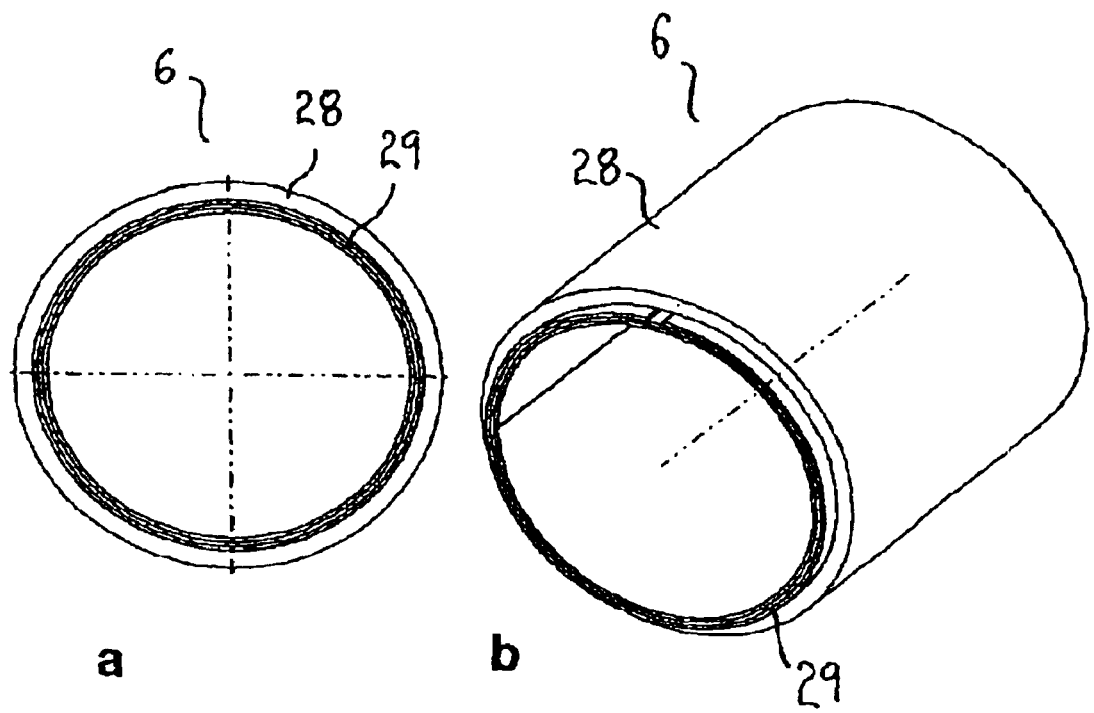

The rotor 6 shown in FIGS. 13a) and b) has an actual aluminium tube 28 equipped with three rolled shells, together forming the steel tube 29, of which each shell has a diameter exceeding the inner diameter of the aluminium tube 28 and a perimeter length less than the inner perimeter length of the aluminium tube 28 so that the shells may be deformed, i.e. having the free ends thereof pressed together to decrease the diameter, prior to insertion into the aluminium tube 28, where after they are released and assume the shape that keep them resiliently in place inside the aluminium tube 28.

Figure 14:
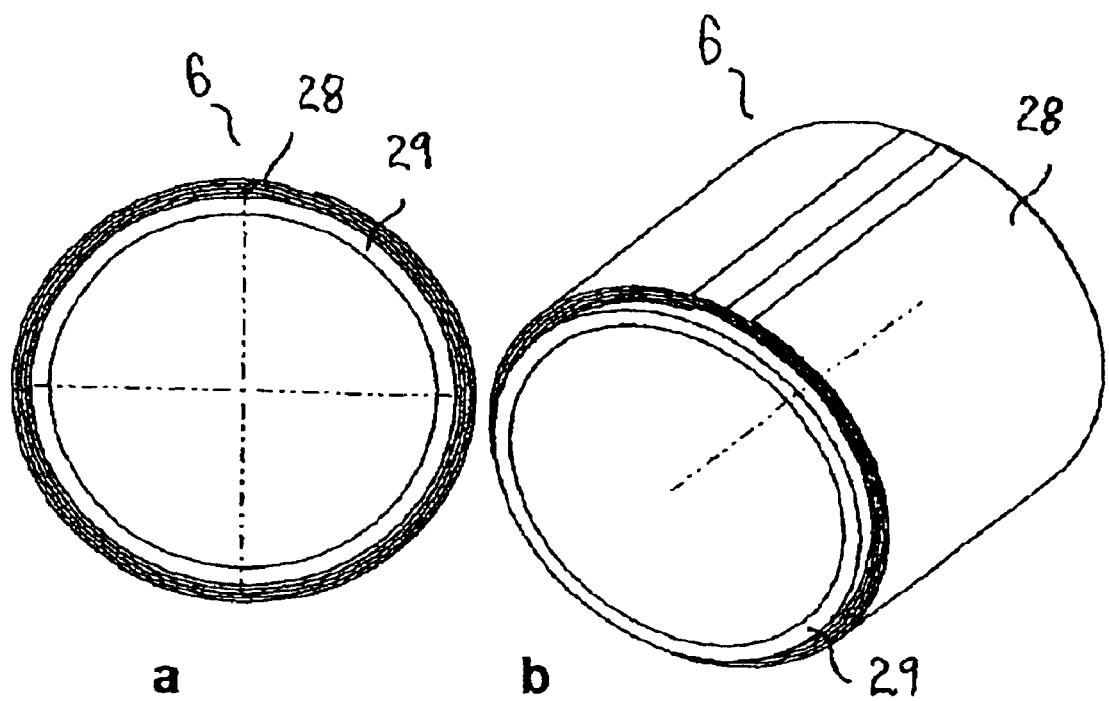

The rotor shown in FIGS. 14a) and b) has an actual steel tube 29 surrounded with an aluminium sheet forming the outer tube 28, the sheet being either rolled into a shape that keeps it resiliently in place or may be glued or welded together.

Figure 15:
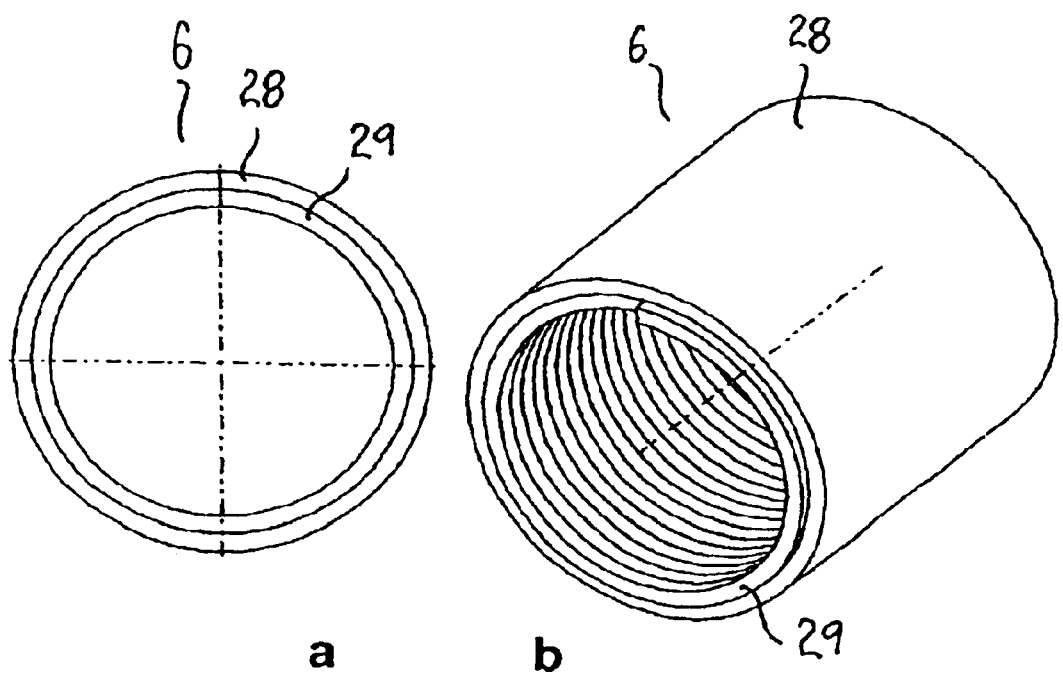

The rotor shown in FIGS. 15a) and b) has an actual aluminium tube 28 equipped with an inner steel tube 29 formed by a helical wound quadratic wire that prior to insertion into the aluminium tube 28 is stretched to decrease its outer diameter. After insertion the helical wound wire is released and it resumes its shape which keeps it resiliently in place inside the aluminium tube 28.

Figure 16:
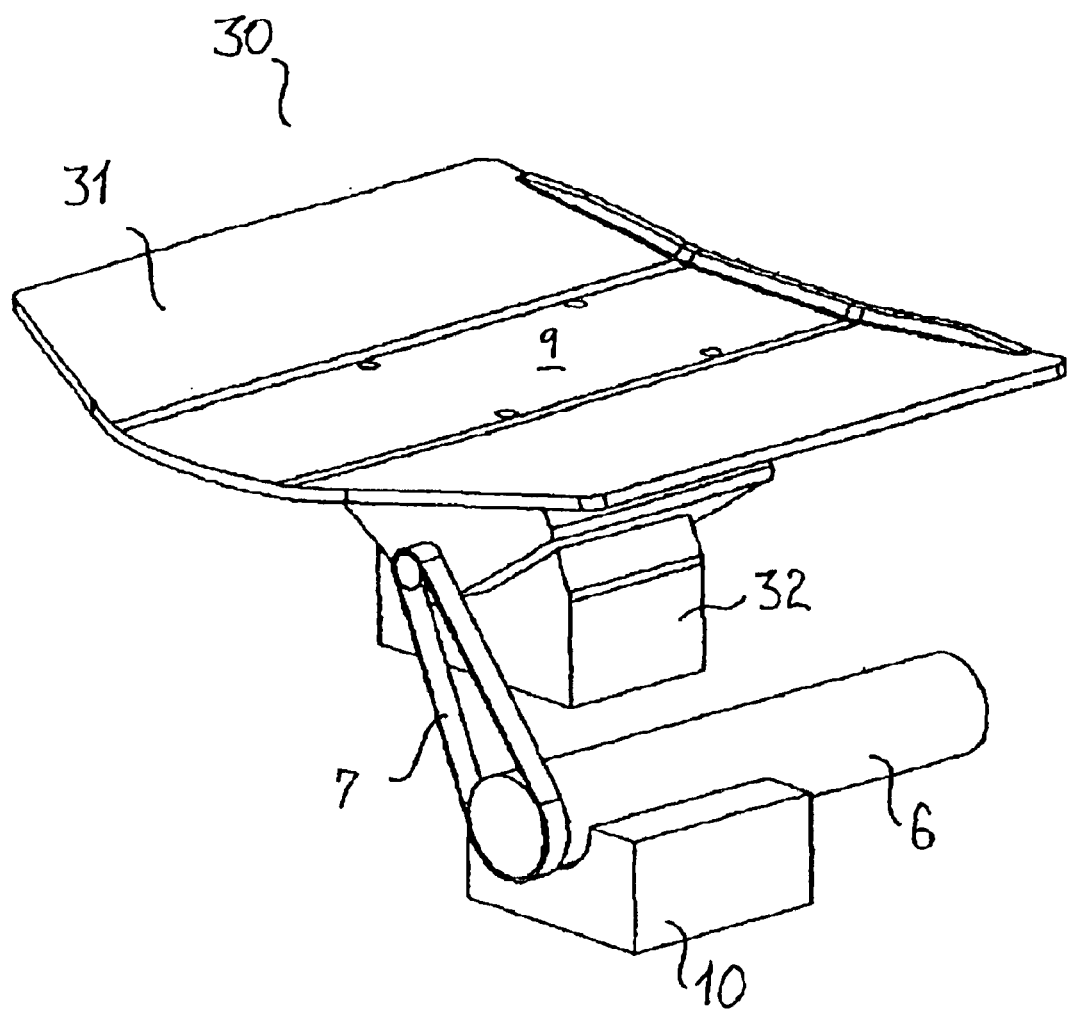
FIG. 16 is a perspective view of a tilt-tray unit according to the second aspect of the invention.
Figure 17:
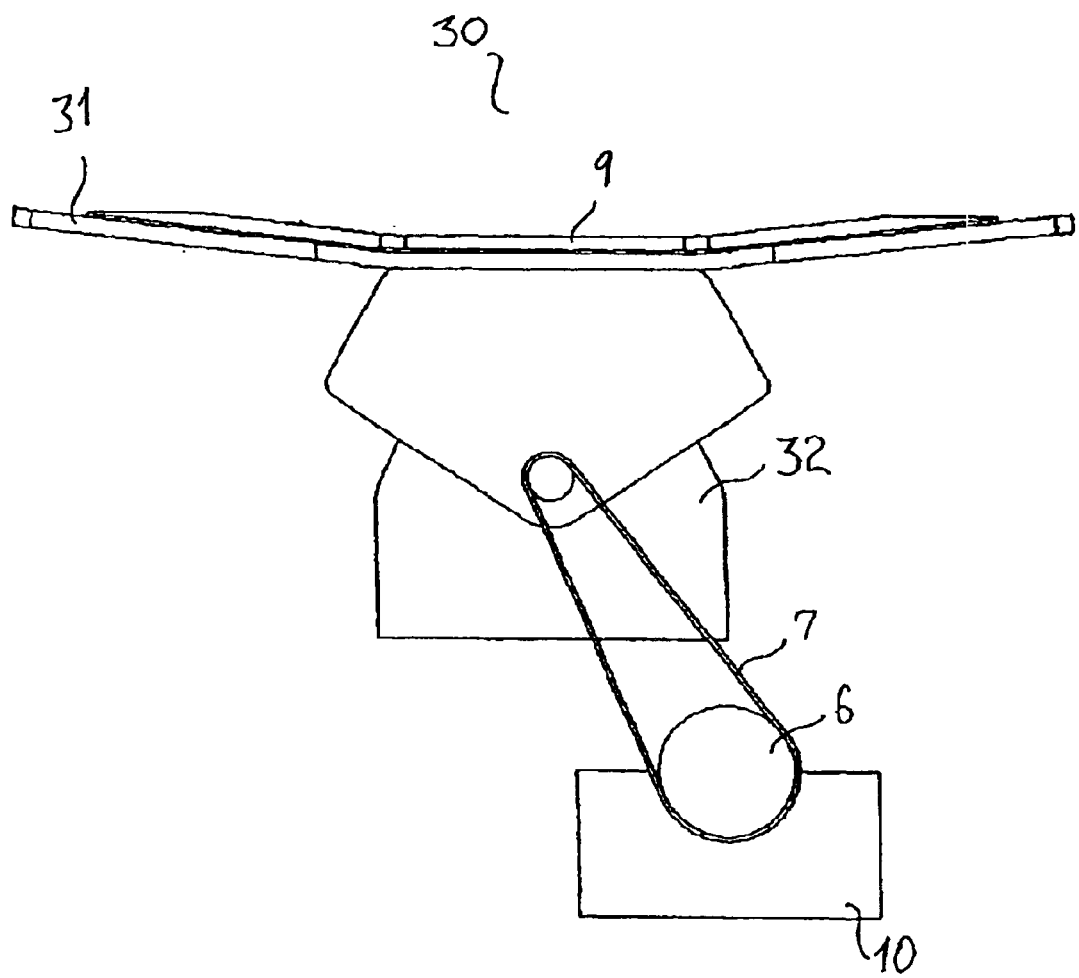
FIG. 17 is a cross-section of the tilt-tray unit of FIG. 16.
Figure 18:
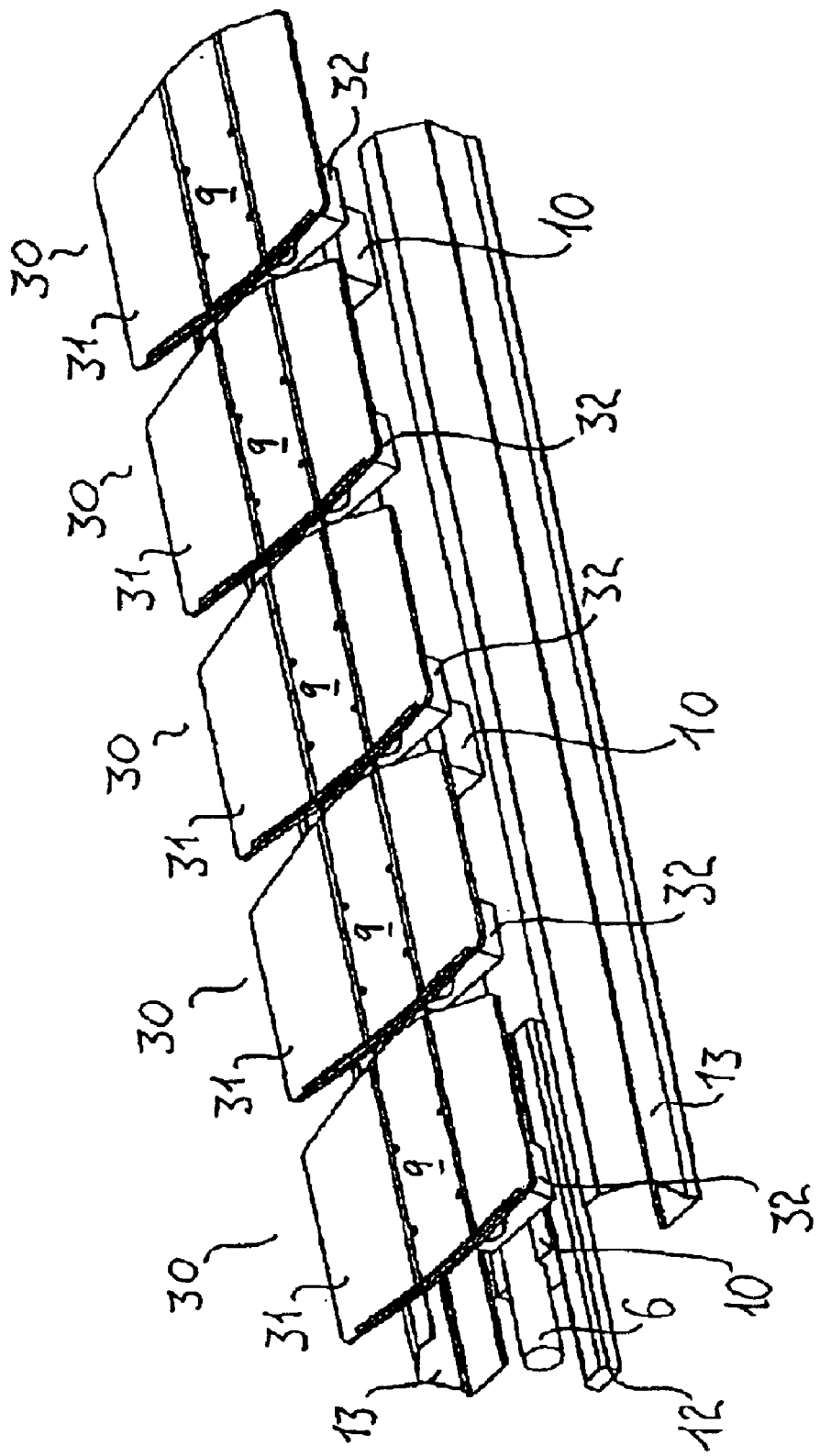
FIG. 18 is a perspective view of a section of a sorter conveyor having the tilt-tray units of FIG. 16.
Figure 19:
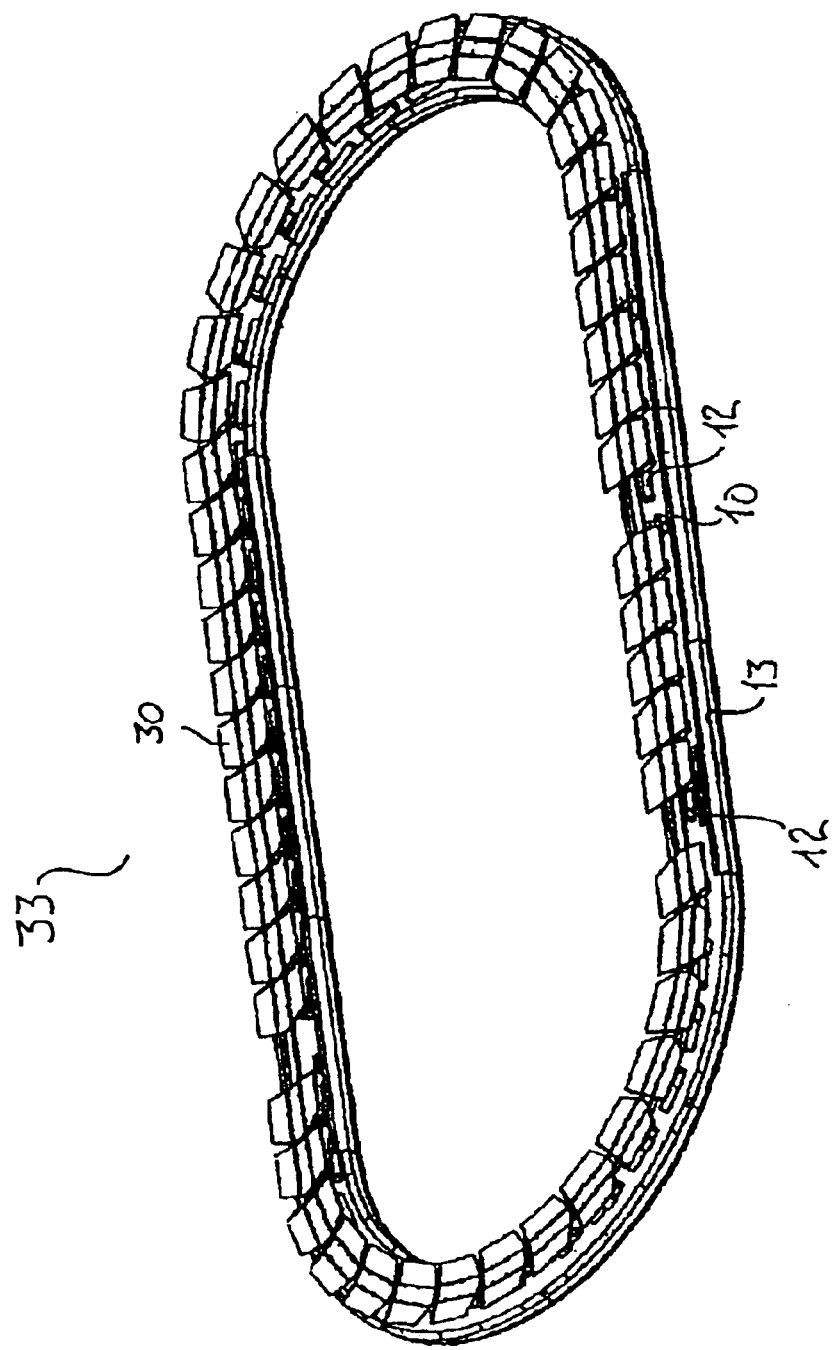
FIG. 19 is a perspective view of a sorter conveyor having the tilt-tray units of FIG. 16.

A tilt-tray unit 30 according to the second aspect of the invention is shown in FIGS. 16 and 17, and a sorter conveyor 33 having the tilt-tray units 30 is shown in FIGS. 18 and 19. The tilt-tray unit 30 has a tilt-tray 31 defining an article-supporting surface 9 and being supported on a tilt unit 32 that supports the tray in upright, article-carrying position as shown as well as in a tilted position to either of the sides in a manner well-known in the prior art. The tilting function is driven by a rotor 6 via a toothed belt 7 wherein the rotor 6 is activated by means of one or more stationary electric stator parts 10 arranged along the path of the sorter conveyor as described above.

What is claimed is:

1. A conveyor comprising
   a stationary track part,
   at least one stationary electric stator part that may be activated selectively to produce a travelling magnetic field and is arranged along the stationary track part,
   a sorter movably arranged to be driven along the stationary track part by means of drive means, and
   a plurality of article-supporting units arranged on the sorter, each unit having
   a flexible member defining an article-supporting surface and being arranged movably in a direction substantially perpendicularly to the direction of motion of the sorter, and
   a rotor susceptible to said travelling magnetic field and arranged to apply a driving force to the flexible member when co-operating with the at least one stationary electric stator part,
   wherein each article-supporting unit comprises
   a drive roller which over a part of its circumference is in driving contact with the flexible member, and
   a transmission means for transmitting driving force from the rotor to the drive roller.

2. A conveyor according to claim 1, wherein the transmission means has a gearing ratio in the range of 1.5 to 5, preferably in the range of 2 to 4, between the rotor and the drive roller, so that the rotor has a higher angular speed than the drive roller.

3. A conveyor according to claim 1, wherein the flexible member is an endless belt.

4. A conveyor according to claim 1, and comprising locking means for preventing the motion of the flexible members of the article-supporting units.

5. A conveyor according to claim 4, wherein the locking means are activated by the deviation from alignment of adjacent article-supporting units in curved sections of the stationary track part.

6. A conveyor according to claim 4, wherein the locking means are activated by the apparent centrifugal force on article-supporting units moving in curved sections of the stationary track part.

7. A conveyor according to claim 4, wherein the locking means are released by means of magnetic forces.

8. A conveyor according to claim 4, wherein the locking means are released by means of the attraction forces between the at least one stationary electric stator part and the rotor.

9. A conveyor according to claim 4, wherein the locking means comprises on each article-supporting unit a stationary part in engagement with a movable part moving simultaneously with the flexible member, characterised in that the resistance against mutual movements between the stationary part and the movable part is substantially lowered during mutual movement between said two parts.

10. A conveyor according to claim 9, wherein the stationary part is a support surface supporting the side of the flexible member opposite the article-supporting surface, and the friction characteristics between the flexible member and the support surface are characterised in that the friction is substantially lowered at mutual movement between said two parts.

11. A conveyor according to claim 1, comprising tilting means for tilting the article-supporting surfaces inwardly when passing curved sections of the stationary track part, and drive mans for driving said tilting means, wherein said drive means are driven by the deviation from alignment of adjacent article-supporting units in curved sections of the stationary track part.

12. A conveyor according to claim 1 comprising feedback means for providing an output to a control unit of the conveyor indicative of the movement of the flexible member.

13. A conveyor according to claim 12, wherein the feedback means comprise a camera for detecting at least two consecutive images of at least one of the flexible member, the rotor or the transmission, and computing means for providing an output from said images.

14. A conveyor according to claim 12, wherein the feedback means detect the extend of rotation of the rotor of each of the article-supporting units and provide an output accordingly.

15. A conveyor according to claim 14, wherein the rotor comprises at least one irregularity of the susceptibility to the travelling magnetic filed, causing the power supplied to the stationary electric stator to vary when the at least one irregularity passes the stationary electric stator during rotation of the rotor, said variation being detected by the feedback means.

16. A conveyor according to claim 14, wherein the outer surface of the rotor comprises at least one irregularity of its optical characteristics and the feedback means comprises a detector for detecting the variation of reflection of a light source caused by the at least one irregularity during rotation of the rotor and providing an output accordingly.

17. A conveyor according to claim 12, wherein each article-supporting unit comprises signal means for producing a signal indicative of the movement of the flexible member and the feedback means comprises a detector for detecting said signals and producing an output accordingly.

18. A conveyor according to claim 17, wherein the signal means comprises at least one passive circuit moving simultaneously with the flexible member, the passive circuits having an induction part for inducting an electric current when exposed to a magnetic field and a transmitter part for transmitting an electromagnetic signal and driven by the inducted current, the feedback means comprising a detector for detecting said signal and providing an output according to the variations of the signal due to said movement of the one or more passive circuits.

19. A conveyor according to claim 1, comprising horizontal alignment means for situating the article-supporting units precisely with respect to the at least one stationary electric stator part in the direction transversely to the conveyance direction of the conveyor.

20. A conveyor according to claim 19, wherein the horizontal alignment means comprises a horizontal wheel arranged on the article-supporting unit and a corresponding two-sided track arranged on the stationary track part.

21. A conveyor according to claim 19, wherein the horizontal alignment means comprises biasing means for providing a biasing force to the article-supporting units toward one side in the transversal direction and reaction means for producing a counter reaction force against said biasing force.

22. A conveyor according to claim 21, wherein the biasing means comprises at least one permanent magnet arranged on each of the article-supporting units and a magnetic susceptible stationary part arranged near the at least one stationary electric stator part displaced in the transversal direction with respect to said at least one permanent magnet such that the mutual magnetic force between the at least one permanent magnet and said stationary part constitutes said biasing force.

23. A conveyor according to claim 1, wherein the at least one stationary electric stator part is suspended movably and comprises biasing means for biasing the stator part towards the rotors of the article-supporting units and one or more distance means for providing a suitable distance between the stator part and the rotors.

24. A conveyor according to claim 1, wherein said drive means comprises one or more stationary linear motor stator parts interacting with said rotors to produce a driving force to drive the sorter along the stationary track part.

25. A conveyor comprising
a stationary track part,
at least one stationary electric stator part that may be activated selectively to produce a travelling magnetic field and is arranged along the stationary track part,
a sorter movably arranged to be driven along the stationary track part by means of drive means, and
a plurality of article-supporting units arranged on the sorter, each unit having
a tray defining an article-supporting surface and being arranged to be tilted in a direction substantially perpendicularly to the direction of motion of the sorter, and
a rotor susceptible to said travelling magnetic field and arranged to apply a driving force to tilt the tray when co-operating with the at least one stationary electric stator part.

26. A conveyor according to claim 25 comprising feedback means for providing an output to a control unit of the conveyor indicative of the movement of the trays.

27. A conveyor according to claim 26, wherein the feedback means comprise a camera for detecting at least two consecutive images of at least one of the tray, the rotor or a transmission there between, and computing means for providing an output from said images.

28. A conveyor according to claim 26, wherein the feedback means detect the extend of rotation of the rotor of each of the article-supporting units and provide an output accordingly.

29. A conveyor according to claim 28, wherein the rotor comprises at least one irregularity of the susceptibility to the travelling magnetic filed, causing the power supplied to the stationary electric stator to vary when the at least one irregularity passes the stationary electric stator during rotation of the rotor, said variation being detected by the feedback means.

30. A conveyor according to claim 28, wherein the outer surface of the rotor comprises at least one irregularity of its optical characteristics and the feedback means comprises a detector for detecting the variation of reflection of a light source caused by the at least one irregularity during rotation of the rotor and providing an output accordingly.

31. A conveyor according to claim 26, wherein each article-supporting unit comprises signal means for producing a signal indicative of the movement of the tray and the feedback means comprises a detector for detecting said signals and producing an output accordingly.

32. A conveyor according to claim 21, wherein the signal means comprises at least one passive circuit moving simultaneously with the tray, the passive circuits having an induction part for inducting an electric current when exposed to a magnetic field and a transmitter part for transmitting an electromagnetic signal and driven by the inducted current, the feedback means comprising a detector for detecting said signal and providing an output according to the variations of the signal due to said movement of the one or more passive circuits.

33. A conveyor according to claim 25, comprising horizontal alignment means for situating the article-supporting units precisely with respect to the at least one stationary electric stator part in the direction transversely to the conveyance direction of the conveyor.

34. A conveyor according to claim 33, wherein the horizontal alignment means comprises a horizontal wheel arranged on the article-supporting unit and a corresponding two-sided track arranged on the stationary track part.

35. A conveyor according to claim 33, wherein the horizontal alignment means comprises biasing means for providing a biasing force to the article-supporting units toward one side in the transversal direction and reaction means for producing a counter reaction force against said biasing force.

36. A conveyor according to claim 35, wherein the biasing means comprises at least one permanent magnet arranged on each of the article-supporting units and a magnetic susceptible stationary part arranged near the at least one stationary electric stator part displaced in the transversal direction with respect to said at least one permanent magnet such that the mutual magnetic force between the at least one permanent magnet and said stationary part constitutes said biasing force.

37. A conveyor according to claim 25, wherein the at least one stationary electric stator part is suspended movably and comprises biasing means for biasing the stator part towards the rotors of the article-supporting units and one or more distance means for providing a suitable distance between the stator part and the rotors.

38. A conveyor according to claim 25, wherein said drive means comprises one or more stationary linear motor stator parts interacting with said rotors to produce a driving force to drive the sorter along the stationary track part.

39. A conveyor comprising
a stationary track part,
at least one stationary electric stator part that may be activated selectively to produce a travelling magnetic field and is arranged along the stationary track part,
a sorter movably arranged to be driven along the stationary track part by means of drive means, and
a plurality of article-supporting units arranged on the sorter, each unit having
article-supporting means defining an article-supporting surface and having discharge means to discharge articles therefrom in a direction substantially perpendicularly to the direction of motion of the sorter, and
a rotor susceptible to said travelling magnetic field and arranged to apply a driving force to the discharge means when co-operating with the at least one stationary electric stator part,
wherein said drive means comprises one or more stationary linear motor stator parts interacting with said rotors to produce a driving force to drive the sorter along the stationary track part.

40. A conveyor according to claim 1, wherein the rotors of at least one of the article-supporting units is a tubular rotor for an asynchronous motor comprising an inner tubular magnetic conducting member and an outer tubular member being electric conducting and non-magnetic conducting, wherein a first of said tubular members is a tube and the second of said tubular members consist of a length of material being deformed into a tubular shape fastened to the first tubular member so as to preserve the tubular shape of the second tubular member as well as the contact between the two tubular members.

41. A conveyor according to claim 25, wherein the rotors of at least one of the article-supporting units is a tubular rotor for an asynchronous motor comprising an inner tubular magnetic conducting member and an outer tubular member being electric conducting and non-magnetic conducting, wherein a first of said tubular members is a tube and the second of said tubular members consist of a length of material being deformed into a tubular shape fastened to the first tubular member so as to preserve the tubular shape of the second tubular member as well as the contact between the two tubular members.

42. A conveyor according to claim 39, wherein the rotors of at least one of the article-supporting units is a tubular rotor for an asynchronous motor comprising an inner tubular magnetic conducting member and an outer tubular member being electric conducting and non-magnetic conducting, wherein a first of said tubular members is a tube and the second of said tubular members consist of a length of material being deformed into a tubular shape fastened to the first tubular member so as to preserve the tubular shape of the second tubular member as well as the contact between the two tubular members.

\* \* \* \* \*